United States Patent
Kim

[19]

[11] Patent Number: 5,825,440
[45] Date of Patent: Oct. 20, 1998

[54] LIQUID CRYSTAL DISPLAY BACKLIGHTING SYSTEM WHICH INCLUDES DICHROIC MIRRORS, OPTICAL LIGHT VALVES, TRANSMISSION TUBES, AND A LIGHT TRANSMISSION PLATE

[75] Inventor: Si-hwan Kim, Seoul, Rep. of Korea

[73] Assignee: Samsung Display Devices Co., Ltd., Kyunggi-do, Rep. of Korea

[21] Appl. No.: 457,622

[22] Filed: Jun. 1, 1995

[30] Foreign Application Priority Data

Dec. 7, 1994 [KR] Rep. of Korea ................. 1994-33169

[51] Int. Cl.$^6$ ..................... G02F 1/1335; G01D 11/28; F21V 7/04
[52] U.S. Cl. ................. 349/61; 349/62; 362/26; 362/31
[58] Field of Search ................. 362/26, 31, 32, 362/293, 331, 332; 359/40, 41, 48, 49, 50, 53, 634; 353/31, 34, 37; 349/61, 62

[56] References Cited

U.S. PATENT DOCUMENTS 4,108,537  8/1978  Watson et al. ..................... 359/634
5,040,877  8/1991  Bline et al. ......................... 359/53
5,260,830  11/1993 Nishida et al. .................... 359/634

FOREIGN PATENT DOCUMENTS 2-296213  12/1990  Japan ..................... 359/48
6-138459   5/1994  Japan ..................... 359/49

Primary Examiner—William L. Sikes
Assistant Examiner—Walter Malinowski
Attorney, Agent, or Firm—Christie, Parker & Hale, LLP

[57] ABSTRACT

Disclosed is an LCD for displaying colour images including a liquid crystal unit for transmitting selectively light rays through pixels under the control of video signals, a video signal supply device for supplying the video signals controlling the pixels of the liquid crystal unit, a monochromatic light ray supplying device for supplying a red, green or blue light ray necessary to present colours under the control of the video signals, and a light supplying device for supplying white light to the monochromatic. The monochromatic light ray supplying device is structured so as to separate the white light provided by the light supplying device into the red, green and blue light rays which light rays are selectively supplied to the pixels of the liquid crystal unit as the video signals control the pixels of the liquid crystal unit.

28 Claims, 3 Drawing Sheets

LIQUID CRYSTAL DISPLAY BACKLIGHTING SYSTEM WHICH INCLUDES DICHROIC MIRRORS, OPTICAL LIGHT VALVES, TRANSMISSION TUBES, AND A LIGHT TRANSMISSION PLATE

BACKGROUND OF THE INVENTION

The present invention concerns a liquid crystal display (LCD) and more particularly means for presenting color images in a liquid crystal display.

Conventionally, a liquid crystal display presents characters and images by employing the property of liquid crystal so that the long axes of the molecules of the liquid crystal change direction according to changes of an applied electric field. Currently, the LCD tends to increase its size and to present color images increasing its pixels, which makes it difficult to control the pixels by means of matrix electrodes. Hence introduced is a thin film transistor LCD (TFT-LCD) where each of the pixels has its own electrodes.

Referring to FIG. 6, TFT-LCD comprises a lower substrate 51 with electrodes 50 respectively formed corresponding to the pixels, an upper substrate 53 with a color filter formed on its upper surface, a pair of polarization plates 54 attached respectively to the outer surfaces of the upper and lower substrates, and a light supplying means 55 mounted on the polarization plate 54 of the lower substrate 51. Conventionally the light supplying means comprises a light transmission plate 56 and a pair of fluorescent tubes 57 respectively attached to both sides of the light transmission plate 56. The electrodes 50 are applied with changing electric voltages to change the molecular direction of the liquid crystal so that the liquid crystal transmits selectively the light supplied from the light supplying means 55 to present images. The color filter comprises a multiplicity of pixels formed corresponding to the positions of the pixels of the liquid crystal and coated with phosphor of red (R), green (G) or blue (B) colour so as to present color images.

In operation, the pixels of the liquid crystal are sequentially scanned by R, G, and B video signals to change its molecular direction, thus selectively transmitting the light supplied from the light supplying means, so that the R, G, and B phosphor pixels of the color filter 52 are excited to emit R, G, and B light rays presenting colour images.

However, it is too costly to precisely manufacture the color filter 52 matching the size of the liquid crystal display by using a process such as photolithography.

SUMMARY OF THE INVENTION

It is an object of the present invention to provide a monochromatic light supplying means for supplying to the LCD a red, green or blue light ray necessary to present colors under the control of video signals, instead of using the conventional color filter attached corresponding to the liquid crystal.

Preferably, the light separating means further comprises first, second and third light selection members. The first light selection member passes only the red light ray (R) of the white light to the first optical valve, reflecting the remaining light to the second light selection member. The second light selection member passes only the red and blue light rays (R and B) to the third light selection member reflecting the remaining green light ray (G) to the second optical valve. The third light selection member passes only the red and green light rays (R and G) outside reflecting the remaining blue light ray (B) to the third optical valve. Meanwhile, only the first light selection member is primarily supplied with the white light from the light supplying means.

Preferably, a first light transmission tube is provided between the first light selection member and the first optical valve to transmit only the red light ray (R) selected by the first light selection member, a second light transmission tube between the second light selection member and the second optical valve to transmit only the green light ray (G) selected by the second light selection member, and a third light transmission tube between the third light selection member and the third optical valve to transmit only the blue light ray selected by the third light selection member.

According to the present invention, an LCD for displaying color images comprises a liquid crystal unit for transmitting selectively light rays through pixels under the control of video signals, a video signal supplying means for supplying the video signals controlling the pixels of the liquid crystal unit, a monochromatic light ray supplying means for supplying a red, green or blue light ray necessary to present colors under the control of the video signals, and a light supplying means for supplying white light to the monochromatic, wherein the monochromatic light ray supplying means is structured so as to separate the white light provided by the light supplying means into the red, green and blue light rays which light rays are selectively supplied to the pixels of the liquid crystal unit as the video signals control the pixels of the liquid crystal unit.

According to an embodiment of the present invention, the monochromatic light ray supplying means further comprises a light separating means for separating the white light into the three monochromatic light rays (R, G, and B), first, second and third optical valves for selectively passing the three monochromatic light rays according to the video signals, and a light transmission plate for transferring the monochromatic light rays passed by the first, second and third optical valves to the pixels of the liquid crystal unit.

Preferably, first, second and third light absorbing tubes are provided respectively at the sides of the first, second and third optical valves opposite the first, second and third light transmission tubes to absorb any possible light leakage through the closed optical valves.

Preferably, the first, second and third light selection members are arranged parallel to each other and to give the incident angle of 45 degrees of the light supplied from the light supplying means to the first light selection member Preferably, a lens is provided between the light supplying means and the first light selection member to focus the light supplied from the light supplying means.

According to another preferred embodiment of the present invention, the light separating means comprises four dichroic mirrors for transmitting only light of given wavelengths and reflecting the remaining wavelengths when sloped at about 45 degrees. The dichroic mirrors are so arranged that the first dichroic mirror transmits the red and green light rays (R and G) delivered to the third dichroic mirror, reflecting the blue light ray (B) to the second dichroic mirror which reflects again the blue light ray (B) to the third optical valve. The third dichroic mirror transmits the red light ray to the first optical valve, reflecting again the green light ray (G) to the fourth dichroic mirror which reflects again the green light ray (G) to the second optical valve. Meanwhile, the light supplied from the light supplying means is primarily delivered only to the first dichroic mirror.

The present invention will now be described more specifically with reference to the drawings attached only by way of example.

DETAILED DESCRIPTION OF THE PREFERRED EMBODIMENT

Figure 1:
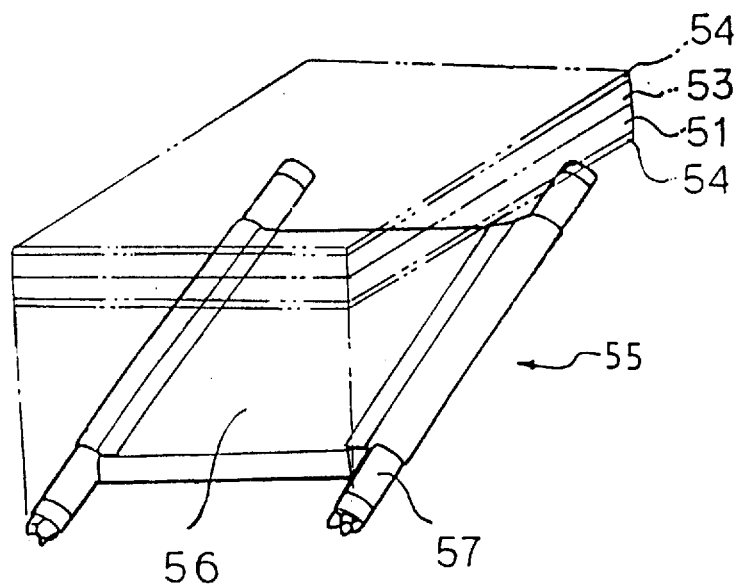
FIG. 1 is a perspective view for illustrating schematically an LCD according to the present invention.

Referring to FIG. 1, a liquid crystal unit comprises upper and lower substrates 53 and 51 and a pair of polarization plates respectively attached to the upper and lower substrates. The inventive monochromatic light supplying means is mounted between the fluorescent tubes 57 of a light supplying means 55 and a light transmission plate 56. The fluorescent tubes are mounted on both sides of the light transmission plate 56 by means of guide tubes 13. The light supplying means supplies white light necessary for color selection to the monochromatic light supplying means which is structured so as to separate the white light into red, green and blue light rays. The monochromatic light rays (R, G, B) are selectively supplied to the pixels of the liquid crystal unit when video signals control the pixels of the liquid crystal unit.

Figure 2:
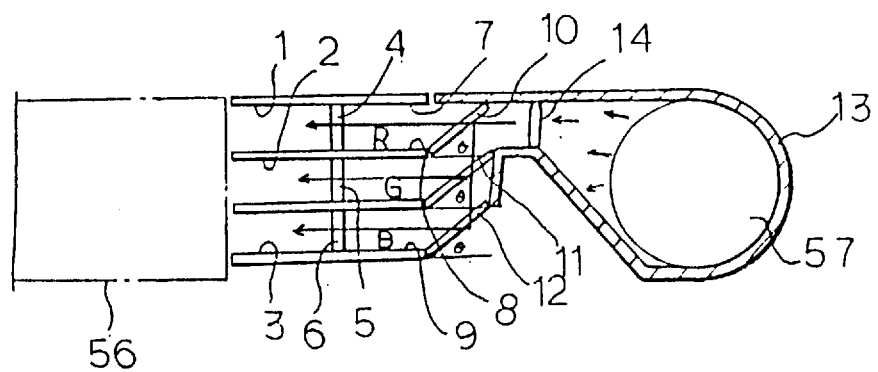
FIG. 2 is a schematic cross section of an LCD according to an embodiment of the present invention.

Referring to FIG. 2, the monochromatic light ray supplying means further comprises a light separating means 10, 11, 12 for separating the white light into the three monochromatic light rays (R, G, and B), first, second and third optical valves 4, 5, and 6 for selectively passing the three monochromatic light rays according to the video signals, and a light transmission plate 56 for transferring the monochromatic light rays passed by the first, second and third optical valves to the pixels of the liquid crystal unit. Preferably, a first light transmission tube 7 is provided between the first light selection member 10 and the first optical valve 4 to transmit only the red light ray (R) selected by the first light selection member. A second light transmission tube 8 is provided between the second light selection member 11 and the second optical valve 5 to transmit only the green light ray (G) selected by the second light selection member. A third light transmission tube 9 is provided between the third light selection member 12 and the third optical valve 6 to transmit only the blue light ray (B) selected by the third light selection member.

The first, second and third optical valves 4, 5 and 6 are made of polymer dispersed liquefied crystal (PDLC) to pass or block light rays when a voltage is applied to them. However, they do not prevent a small amount of light leakage. Hence, in order to eliminate the leakage, first, second and third light absorbing tubes 1, 2 and 3 are provided respectively at the sides of the first, second and third optical valves 4, 5, and 6 opposite to the first, second and third light transmission tubes 7, 8 and 9 for absorbing any possible light leakage through the closed optical valves. Of course, if the optical valves 4, 5, and 6 are made of a material that never allows such leakage, it is not necessary to provide such light absorbing tubes.

According to one aspect of the present invention, the light separating means further comprises first, second and third light selection members 10, 11 and 12. The first light selection member 10 passes only the red light ray (R) of the white light to the first optical valve, reflecting the remaining light to the second light selection member 11. The second light selection member passes only the red and blue light rays (R and B) to the third light selection member, reflecting the remaining green light ray (G) to the second optical valve. The third light selection member 12 passes only the red and green light rays (R and G) outside, reflecting the remaining blue light ray (B) to the third optical valve. Meanwhile, the light supplying means primarily supplies the white light only to the first light selection member 10.

The light selection members 10, 11, and 12 are mounted sloped at a given angle so as to send the incident light rays to another light selection member or their respective light transmission tubes. For example, the light selection members 10, 11, and 12 are arranged parallel to each other to give the incident angle of 45 degrees of the light supplied from the light supplying means 13, and 57 to the first light selection member 10. Additionally, a lens 14 is provided between the light supplying means 13, and 57 and the first light selection member 10 for focusing the light supplied from the light supplying means.

Figure 3:
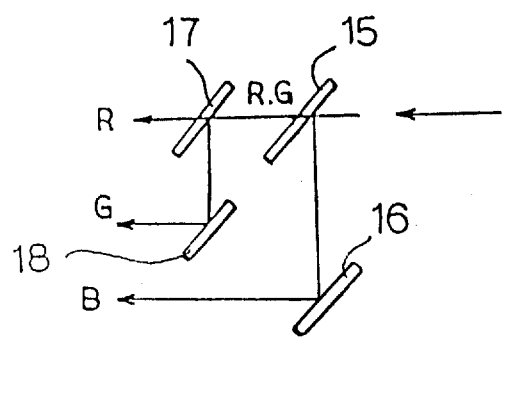
FIG. 3 is a schematic diagram for illustrating the structure of the light separating means of a monochromatic light supplying means according to an embodiment of the present invention.

Referring to FIG. 3 for illustrating another embodiment of the present invention, the light separating means comprises four dichroic mirrors 15, 16, 17, and 18 for transmitting only light of given wavelengths and reflecting the remaining wavelengths when sloped at about 45 degrees. The dichroic mirrors are so arranged that the first dichroic mirror 15 transmits the red and green light rays (R and G) delivered to the third dichroic mirror 17, reflecting the blue light ray (B) to the second dichroic mirror 16 which reflects again the blue light ray (B) to the third optical valve. The third dichroic mirror 17 transmits the red light ray (R) to the first optical valve, reflecting again the green light ray (G) to the fourth dichroic mirror 18 which reflects again the green light ray (G) to the second optical valve. Meanwhile, the light supplied from the light supplying means 13, and 57 is primarily delivered only to the first dichroic mirror 15. The dichroic mirrors 15, 16, 17, and 18 are arranged parallel to each other to give the incident angle of 45 degrees of the light supplied from the light supplying means 13, and 57 to the first dichroic mirror 15.

Figure 4:
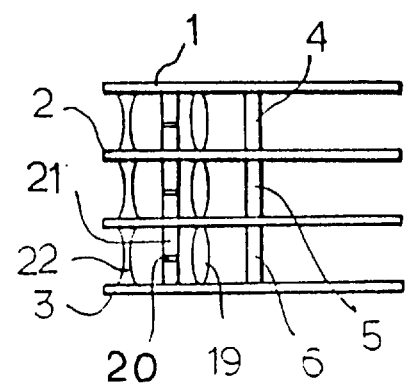
FIG. 4 is a schematic cross section of a light cohering means provided in the monochromatic light supplying means for enhancing the directionality of the monochromatic light rays according to a preferred embodiment of the present invention.
Figure 5:
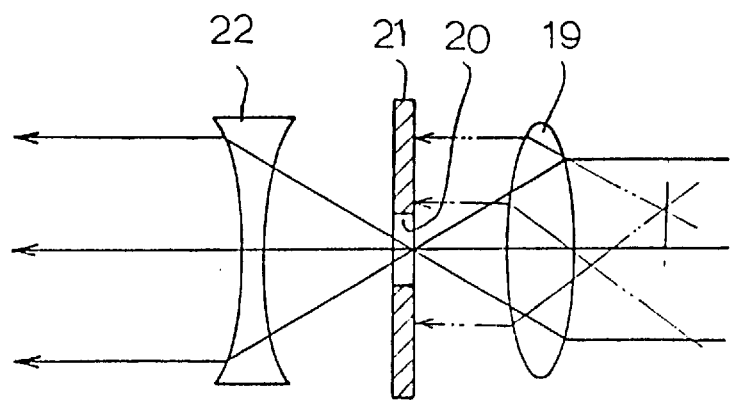
FIG. 5 is a diagram for illustrating the operational effect of the light cohering means shown in FIG. 4.
Figure 6:
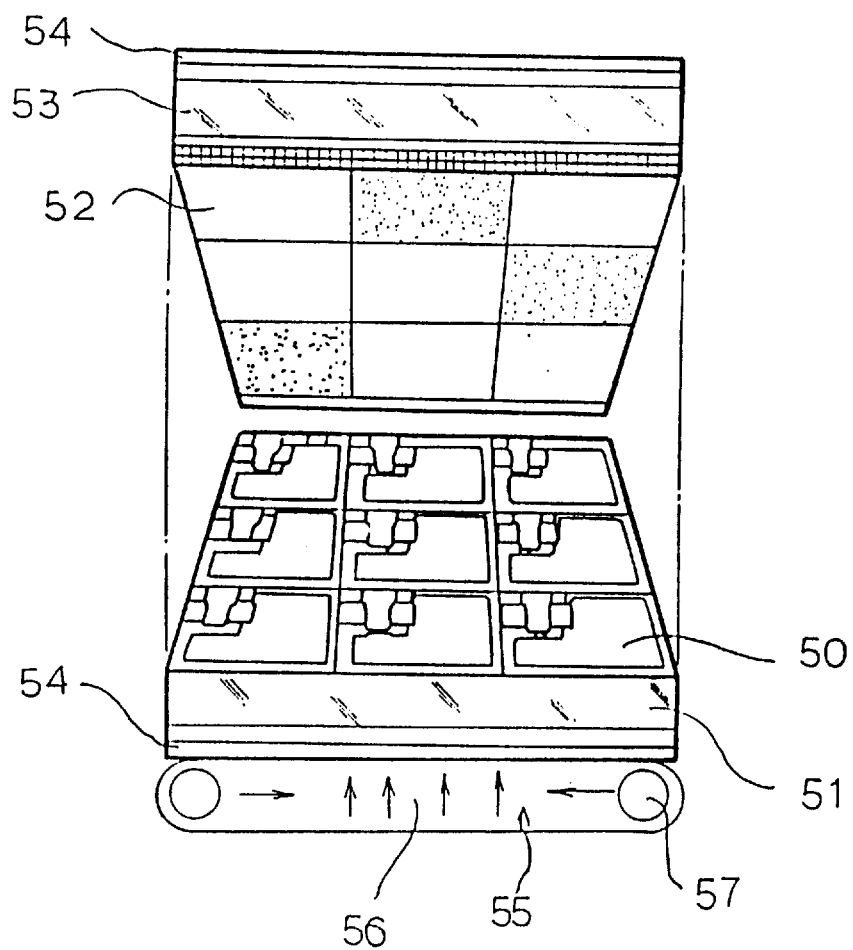
FIG. 6 is a perspective view for illustrating schematically a conventional LCD.

Referring to FIG. 4, a light cohering means is preferably provided before each of the optical valves for cohering the monochromatic light rays passed through the optical valves 4, 5, and 6 to enhance the directionality. The light cohering means comprises a convex lens 19 provided before each of the three optical valves 4, 5, and 6 for focusing the monochromatic light rays, a light screen 21 provided before the convex lens with a slit 20 formed in the focusing position of the convex lens, and a concave lens 22 provided before the light screen, thereby enhancing the directionality of the monochromatic light rays.

The operational effect of the inventive LCD for presenting color images are as follows:

The white light radiated from the fluorescent tubes 57 is converged and impinged upon the first light selection member 10 or the first dichroic mirror 15. The focusing lens 14 converges the light radiated from the fluorescent tubes 57 to improve the light transmission efficiency. The first light selection member 10 passes only the red light ray (R) of the received white light to the first optical valve 4, reflecting the remaining light to the second light selection member 11.

The second light selection member 11 reflects the green light ray (G) of the light (G and B) received from the first light selection member 10 toward the second optical valve 5, passing the remaining blue light ray (B) to the third light selection member 12. The third light selection member 12 reflects the blue light ray (B) to the third optical valve 6. Thus, the white light supplied by the light supplying means 13 and 57 is separated by the light separating means 10, 11 and 12 into R, G and B light rays delivered respectively to the first, second and third optical valves 4, 5 and 6, which valves in turn deliver the three color light rays to the liquid crystal unit via the light transmission plate 56 under the control of the video signals. The LCD pixels of the liquid crystal unit changes the molecular directions according to the R, G, and B video signals inputted at a rate over 20 frames per second to properly transmit the R, G, and B color light rays, thereby display colour images.

The undesirable light leakage through the optical valves 4, 5, and 6 close when not receiving a current signal and is absorbed by the light absorbing tubes 1, 2, and 3, so that the color images obtained are more clear.

Meanwhile, as shown in FIG. 3, it is evident that the same effect is obtained by using the four dichroic mirrors 15, 16, 17, and 18 instead of the first, second and third light selection members 10, 11 and 12.

In addition, the three-color presenting light rays straightly passing through the optical valves 4, 5, and 6 go into the convex lens 19 in parallel with its central axis converged into the slit 20 while the scattered light rays are blocked by the light screen, thereby improving the visual effect. Consequently, the opening of the optical valves 4, 5, and 6 is more precisely distinguished from the closing, eliminating noises, so that the LCD displays clearer color images.

What is claimed is:

1. A front panel liquid crystal display (LCD) for displaying color images, comprising:

a liquid crystal unit for transmitting selectively light rays through pixels under the control of video signals;

video signal supplying means for supplying said video signals controlling the pixels of said liquid crystal unit; and monochromatic light ray supplying means for supplying red, green and blue light rays necessary to present colors under the control of said video signals;

wherein said monochromatic light ray supplying means comprises:

light supplying means for supplying white light;

first, second and third light selection members for separating said white light into three monochromatic light rays comprising said red, green and blue light ray;

first, second and third optical valves for selectively passing said three monochromatic light rays according to said video signals;

first, second and third tubes for transmitting said three monochromatic light rays; and a light transmission plate for separately transferring said three monochromatic light rays passed by said first, second and third optical valves to the pixels of said liquid crystal unit.

2. The LCD as defined in claim 1 wherein said first light selection member passes only said red light ray of said white light to said first optical valve, reflecting the remaining light to said second light selection member, said second light selection member passes only said blue light ray to said third light selection member, reflecting the remaining green light ray to said second optical valve, said third light selection member reflects the remaining blue light ray to said third optical valve, and said light supplying means primarily supplies said white light only to said first light selection member.

3. The LCD as defined in claim 2 wherein said first light transmission tube is provided between said first light selection member and said first optical valve for transmitting only the red light ray selected by said first light selection member, said second light transmission tube is provided between said second light selection member and said second optical valve for transmitting only the green light ray selected by said second light selection member, and said third light transmission tube is provided between said third light selection member and said third optical valve for transmitting only the blue light ray selected by said third light selection member.

4. The LCD as defined in claim 3, further comprising a lens provided between said light supplying means and said first light selection member for focusing the light supplied from said light supplying means.

5. The LCD as defined in claim 3, wherein said first, second and third light selection members are arranged parallel to each other and arranged to give the incident angle of 45 degree of the light supplied from said light supplying means to said first light selection member.

6. The LCD as defined in claim 5, further comprising a lens provided between said light supplying means and said first light selection member for focusing the light supplied from said light supplying means.

7. The LCD as defined in claim 1, wherein said first, second and third light selection members are arranged parallel to each other and arranged to give an the incident angle of 45 degrees of the light supplied from said light supplying means to said first light selection member.

8. The LCD as defined in claim 7, further comprising a lens provided between said light supplying means and said first light selection member for focusing the light supplied from said light supplying means.

9. The LCD as defined in claim 1 further comprising a lens provided between said light supplying means and said first light selection member for focusing the light supplied from said light supplying means.

10. The LCD as defined in claim 1 further comprising light cohering means provided before each of said optical valves for cohering said monochromatic light rays passed through said optical valves to enhance the directionality.

11. The LCD as defined in claim 10 wherein said light cohering means comprises a convex lens provided before each of said first, second and third optical valves for focusing said monochromatic light rays, a light screen provided before said convex lens with a slit formed in the focusing position of said convex lens, and a concave lens provided before said light screen, thereby enhancing the directionality of said monochromatic light rays.

12. The LCD as defined in claim 1 wherein said first, second and third optical valves are made of polymer dispersed liquefied crystal (PDLC).

13. The LCD as defined in claim 1 wherein the insides of said light absorbing tubes are coated black.

14. The LCD as defined in claim 1 wherein said first, second and third tubes comprises first, second and third light transmission portions provided between said first, second and third light selection members and said first, second and third optical valves, respectively.

15. The LCD as defined in claim 14 wherein said first, second and third tubes comprises first, second and third light absorbing portions provided respectively at said first, second and third optical valves opposite to said first, second and third light transmission portions for absorbing any possible light leakage through the closed optical valves.

16. A front panel liquid crystal display (LCD) for displaying color images, comprising:

a liquid crystal unit for transmitting selectively light rays through pixels under the control of video signals;

video signal supplying means for supplying said video signals controlling the pixels of said liquid crystal unit; and monochromatic light ray supplying means for supplying red, green and blue light rays necessary to present colors under the control of said video signals;

wherein said monochromatic light ray supplying means comprises:

light supplying means for supplying white light;

first, second, third and fourth dichroic mirrors for separating said white light into three monochromatic light rays comprising said red, green and blue light rays;

first, second and third optical valves for selectively passing said three monochromatic light rays according to said video signals;

first, second and third light transmission tubes provided between said first, second and third light selection members and said first, second and third optical valves respectively for transmitting said three monochromatic light rays;

first, second and third light absorbing tubes provided respectively at said first, second and third optical valves opposite to said first, second and third light transmission tubes for absorbing any possible light leakage through the closed optical valves; and a light transmission plate for transferring said monochromatic light rays passed by said first, second and third optical valves to the pixels of said liquid crystal unit.

17. The LCD as defined in claim 16 wherein said four dichroic mirrors transmit only light of given wavelengths and reflect the remaining wavelengths when sloped at approximately 45 degrees, which dichroic mirrors are so arranged that the first dichroic mirror transmits said red and green light rays to the third dichroic mirror, reflecting said blue light ray to the second dichroic mirror which reflects again said blue light ray to said third optical valve, said third dichroic mirror transmits said red light ray to said first optical valve, reflecting again said green light ray to the fourth dichroic mirror which reflects again said green light ray to said second optical valve, and the light supplied from said light supplying means is primarily delivered only to said first dichroic mirror.

18. The LCD as defined in claim 17 wherein said first light transmission tube is provided between said third dichroic mirror and said first optical valve for transmitting only said red light ray selected by said third dichroic mirror, said second light transmission tube is provided between said fourth dichroic mirror and said second optical valve for transmitting only the green light ray selected by said fourth dichroic mirror, and said third light transmission tube is provided between said second dichroic mirror and said third optical valve for transmitting only the blue light ray selected by said second dichroic mirror.

19. The LCD as defined in claim 18 further comprising a lens provided between said lighting supplying means and said first dichroic mirror for focusing the light supplied from said light supplying means.

20. The LCD as defined in claim 18, wherein said first, second, third and fourth dichroic mirrors are arranged parallel to each other and arranged to give the incident angle of 45 degrees of the light supplied from said light supplying means to said first dichroic mirror.

21. The LCD as defined in claim 20 further comprising a lens provided between said light supplying means and said first dichroic mirror for focusing the light supplied from said light supplying means.

22. The LCD as defined in claim 16 wherein said first, second, third and fourth dichroic mirrors are arranged parallel to each other and arranged to give an incident angle of 45 degrees of the light supplied from said light supplying means to said first dichroic mirror.

23. The LCD as defined in claim 22 further comprising a lens provided between said light supplying means and said first dichroic mirror for focusing the light supplied from said light supplying means.

24. The LCD as defined in claim 16 further comprising a lens provided between said light supplying means and said first dichroic mirror for focusing the light supplied from said light supplying means.

25. The LCD as defined in claim 16 further comprising light cohering means provided before each of said optical valves for cohering said monochromatic light rays passed through said optical valves to enhance the directionality.

26. The LCD as defined in claim 25 wherein said light cohering means comprises a convex lens provided before each of said first, second and third optical valves for focusing said monochromatic light rays, a light screen provided before said convex lens with a slit formed in the focusing position of said convex lens, and a concave lens provided before said light screen, thereby enhancing the directionality of said monochromatic light rays.

27. The LCD as defined in claim 16 wherein said first second and third optical valves are made of polymer dispersed liquefied crystal (PDLC).

28. The LCD as defined in claim 16 wherein the insides of said light absorbing tubes.

* * * * *

UNITED STATES PATENT AND TRADEMARK OFFICE
CERTIFICATE OF CORRECTION

PATENT NO. : 5,825,440
DATED : October 20, 1998
INVENTOR(S) : Si-hwan Kim

It is certified that error appears in the above-identified patent and that said Letters Patent is hereby corrected as shown below:

Title page, item [54], the title should read
-- THREE LIGHT SELECTION MEMBERS --.
Column 1, line 3, the title should read
-- THREE LIGHT SELECTION MEMBERS --.

Column 1, lines 57-67 through column 2, lines 1-12, move the two paragraphs beginning with "Preferably, the light separating means..." and ending with "... selected by the third light selection member." and insert in column 2 between lines 36 and 37, between the paragraph ending with "... liquid crystal unit." and the paragraph beginning with "Preferably, first, second and third light..."

Column 2, line 46, after "member" insert a period.
Column 4, lines 25,27, after "13" delete the comma (both occurrences).
Column 4, lines 45,49, after "13" delete the comma (both occurrences).
Column 5, line 18, change "directions" to -- direction --.

UNITED STATES PATENT AND TRADEMARK OFFICE
CERTIFICATE OF CORRECTION

PATENT NO. : 5,825,440
DATED : October 20, 1998
INVENTOR(S) : Si-hwan Kim

It is certified that error appears in the above-identified patent and that said Letters Patent is hereby corrected as shown below:

Column 6, line 27, change "degree" to -- degrees --.
Column 6, line 34, replace "give an the incident" with
 -- give an incident --.
Column 8, line 53, after "absorbing tubes" insert -- are coated black --.

Signed and Sealed this

Twenty-fourth Day of October, 2000

Attest:

Q. TODD DICKINSON

*Attesting Officer*  *Director of Patents and Trademarks*